US009449363B2

(12) United States Patent
Tsakok et al.

(10) Patent No.: US 9,449,363 B2
(45) Date of Patent: Sep. 20, 2016

(54) SAMPLING, FAULT MANAGEMENT, AND/OR CONTEXT SWITCHING VIA A COMPUTE PIPELINE

(71) Applicant: Intel Corporation, Santa Clara, CA (US)

(72) Inventors: John A. Tsakok, Folsom, CA (US); Brandon L. Fliflet, Edh, CA (US); Jayanth N. Rao, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 55 days.

(21) Appl. No.: 14/318,562

(22) Filed: Jun. 27, 2014

(65) Prior Publication Data

US 2015/0379730 A1 Dec. 31, 2015

(51) Int. Cl.
*G06T 7/40* (2006.01)
*G06T 15/04* (2011.01)
*G06T 1/60* (2006.01)
*G06T 1/20* (2006.01)
*G06T 15/00* (2011.01)

(52) U.S. Cl.
CPC ............... *G06T 1/60* (2013.01); *G06T 15/005* (2013.01); *G06T 15/04* (2013.01)

(58) Field of Classification Search
CPC ... G06T 15/04; G06T 11/001; G06T 15/005; G06T 1/60; G06T 15/503; G06T 15/50; G06T 1/20; G09G 5/363; G09G 5/393
See application file for complete search history.

(56) References Cited

U.S. PATENT DOCUMENTS

| 6,259,460 | B1 | 7/2001 | Gossett et al. |
| 6,297,832 | B1* | 10/2001 | Mizuyabu ................. G06T 1/60 345/531 |
| 7,411,592 | B1* | 8/2008 | Dunn ....................... G06T 15/60 345/426 |
| 2009/0073168 | A1* | 3/2009 | Jiao ........................ G06T 15/005 345/426 |
| 2010/0079489 | A1 | 4/2010 | Cheng et al. |
| 2010/0118028 | A1* | 5/2010 | Pallister .................. G06T 15/04 345/419 |
| 2012/0229481 | A1* | 9/2012 | McCrary ............... G06F 9/5044 345/522 |
| 2013/0100132 | A1* | 4/2013 | Katayama .......... H04N 13/0022 345/420 |
| 2013/0169651 | A1 | 7/2013 | Minkin |

(Continued)

OTHER PUBLICATIONS

Office Action received for Great Britain Patent Application No. 1508928.7, mailed Nov. 20, 2015, 6 pages.

(Continued)

*Primary Examiner* — Todd Buttram
(74) *Attorney, Agent, or Firm* — Jordan IP Law, LLC

(57) ABSTRACT

Apparatuses, systems, and methods may sample a texture, manage a page fault, and/or switch a context associated with the page fault. A three-dimensional (3D) graphics pipeline may provide texture sample location data corresponding to a texture, wherein sampling of the texture is to be executed external to the 3D graphics pipeline. A compute pipeline may execute sampling of the texture utilizing the texture sample location data and provide texture sample result data corresponding to the texture, wherein the 3D graphics pipeline may composite a frame utilizing the texture sample result data. The compute pipeline may manage a page fault, wherein the page fault and/or management of the page fault may be hidden from a graphics application. In addition, the compute pipeline may switch a compute context associated with the page fault to allow a graphics task not associated with the page fault to be executed and/or to prevent a stall.

24 Claims, 5 Drawing Sheets

(56) References Cited

U.S. PATENT DOCUMENTS

| | | | |
|---|---|---|---|
| 2014/0218364 A1* | 8/2014 | Collins | G06T 15/60 345/426 |
| 2015/0042667 A1* | 2/2015 | Poddar | G09G 5/14 345/531 |
| 2015/0084952 A1* | 3/2015 | Moreton | G06T 19/00 345/420 |

OTHER PUBLICATIONS apple.com, "Synchronization dispatch semaphore 2x.png (1246×813", retrieved on Oct. 29, 2014, 1 page.

Search Report for Taiwanese Patent Application No. 104116809, mailed on Apr. 1, 2016, 2 pages.

\* cited by examiner

SAMPLING, FAULT MANAGEMENT, AND/OR CONTEXT SWITCHING VIA A COMPUTE PIPELINE

BACKGROUND

A three-dimensional (3D) graphics pipeline may execute sampling. For example, the 3D graphics pipeline may calculate texture coordinates at a pixel shader, send the coordinates to a sampler for sampling, receive pixel data from the sampler at the pixel shader, and return an output from the shader to a render target. A 3D context associated with a page fault, however, cannot be switched without waiting. For example, a fault on a texture read may halt a graphics processing unit (GPU) and may not allow forward progress on other hardware contexts until sufficient forward progress is made to reach completion of a current primitive. Thus, a relatively large polygon having a relatively large number of page faults may cause a stall. In a windowed application, for example, a 3D hardware context that renders a graphical user interface (GUI) may not be scheduled and may result in an unresponsive platform when a fault is encountered.

Texture or page table management systems may be implemented in an application (e.g., MegaTextures from id Software) or a driver extension (e.g., AMD_sparse_texture from Advanced Micro Devices Inc., Tiled Textures from Microsoft Corporation) to page-in (make resident) a subset of textures into memory for rendering a current frame/view. Extensive changes, however, to an application, application programming interface (API), and/or driver may be required to support the systems. In addition, a graphics application may need to be page aware and/or fault aware, wherein the shader checks for fault codes returned by the sampler and writes out missing page identifiers to a buffer (e.g., unordered access view) to allow the application host code to upload missing pages. Moreover, without hardware support for tiled resources, the application may need to manage partitioning of textures into tiles with proper borders to allow filtering and relatively complex page look-ups in the shader. The shader may also be required to bypass hardware sampler filtering functions and compute using execution unit (EU) instructions since a GPU may not know a location of mip-maps and/or adjacent textures in a software-managed texture cache.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
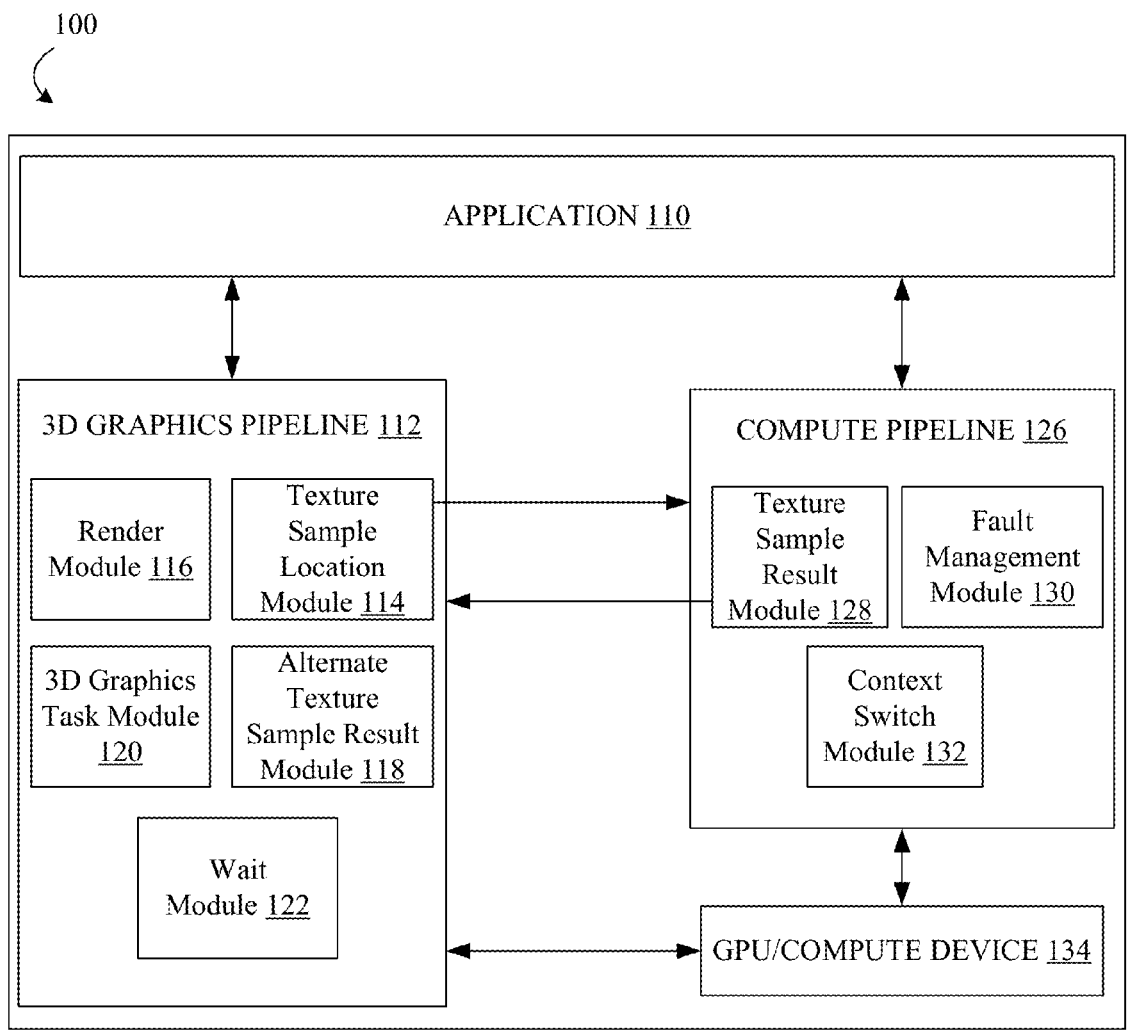
FIG. 1 is a block diagram of an example of a sampling, fault management, and/or context switching apparatus according to an embodiment.

FIG. 1 shows a sampling, fault management, and/or context switching apparatus 100 according to an embodiment. The apparatus 100 may include any computing platform such as a laptop, personal digital assistant (PDA), wireless smart phone, media content player, imaging device, mobile Internet device (MID), server, gaming console, wearable computer, any smart device such as a smart phone, smart tablet, smart TV, and so on, or any combination thereof. The apparatus 100 may include one or more processors, such as a central processing unit (CPU), a graphics processing unit (GPU) (may also be referred to as a visual processing unit (VPU)), and so on, or combinations thereof. In one graphics execution model, the apparatus 100 may include one or more hosts (e.g., CPU, etc.) to control one or more compute devices (e.g., CPU, GPU/VPU, etc.), wherein each compute device may include one or more compute units (e.g., cores, single instruction multiple data units, etc.) having one or more execution elements to execute functions, discussed below.

The apparatus 100 includes an application 110, such as a three-dimensional (3D) graphics application, which may communicate with one or more pipelines to execute a graphics task including, for example, rendering a particle effect, rendering a shadow map, sampling a texture, compositing a frame, displaying a frame, and so on. The application 110 may not need to be page aware and/or fault aware, wherein a page fault and/or management of the page fault may be hidden from the application 110. In addition, the page fault may not cause a stall since a context associated with the page fault (e.g., faulting context) may be switched (e.g., substantially immediately switched) without waiting for sufficient forward progress to reach completion of a current primitive, allowing another graphics task (e.g., not involving texture sampling, not associated with a fault, etc.) to be executed.

The application 110 may communicate with a three-dimensional (3D) graphics pipeline 112 to composite a frame for display. The frame may correspond to, for example, a 3D rendering of a scene and/or a video game, a spreadsheet, text (e.g., Rich Text, etc.), a markup language (e.g., Hypertext Markup Language, Extensible Markup Language, etc.), an image (e.g., joint photographic experts group (JPEG) data, etc.), a video (e.g., moving picture experts group (MPEG) data, etc.), and so on, or combinations thereof. In addition, the frame may correspond to a windowed application including, for example, a graphical user interface (GUI). The frame may also correspond to an application requiring relatively high frame rate responsiveness (e.g., approximately 30 frames per second). The apparatus 100 may display the frame after the 3D graphics pipeline 112 composites the frame via, for example, a liquid crystal display (LCD), a light emitting diode (LED) display, a touch screen, and so on.

The 3D graphics pipeline 112 may support a 3D application programming interface (API) such as, for example, an Open Graphics Library API (OpenGL®, a trademark of Silicon Graphics, Inc.), a Direct3D API (Direct3D®, a trademark of Microsoft Corporation), and so on. The application 110 may, for example, use a 3D API to process commands and composite a frame by creating a 3D context, which may correspond to a state of a 3D pipeline for a workload. For example, the application 110 may use OpenGL by creating an OpenGL context, which may correspond to a state machine that stores data related to rendering of the application 110. In addition, the illustrated 3D graphics pipeline 112 includes a texture sample location module 114 to provide texture sample location data corresponding to a texture such as, for example, information utilized for sampling the texture (e.g., texture coordinates and/or gradients for determining the location in a texture to sample from). The texture sample location module 114 may be, for example, included in the source code of the application 110, included as an extension for the application 110, implemented in a driver, implemented at least partially in fixed-functionality hardware, and so on, or combinations thereof.

The texture sample location module 114 may generate a sample information buffer to hold texture sample location data including, for example, a texture coordinate, a uv coordinate, a gradient (e.g., dx/dy), a texture handle, level of detail (LOD), and so on, or combinations thereof. The sample information buffer may be included as a layer in a G-buffer that has multiple layers to hold graphics data such as, for example, positions, normals, shading parameters, etc. The G-buffer may be generated in a deferred shading process, wherein geometry is processed in a single pass to output the G-Buffer and further passes are executed as two-dimensional (2D) post processing passes to composite a final frame. Of note, sampling a texture may be executed external to the 3D graphics pipeline 112, which may correspond to an operation that uses texture coordinates and/or gradients to retrieve information for a texture such as color data. In one example, fragments may be processed external to the 3D graphics pipeline 112 to generate texture sample result data (e.g., a color, etc.) by sampling a texture using the texture sample location data (e.g., texture coordinates, sample information buffer, etc.).

Accordingly, the apparatus 100 includes a compute pipeline 126 to execute sampling external to the 3D graphics pipeline 112 and/or to provide texture sample result data for use by 3D graphics pipeline 112 to composite a frame. The compute pipeline 126 may support a compute API such as, for example, an Open Computing Language API (OpenCL®, a trademark of Apple Inc.), a Compute Shader API (e.g., expands Direct3D), a Compute Unified Device Architecture API (CUDA™, a trademark of NVIDIA Corporation), and so on. The application 110 may, for example, use a compute API to execute sampling and to provide texture sample result data by creating a compute context. For example, the application 110 may use OpenCL by creating an OpenCL context, which allows a compute device (e.g., CPU, GPU/VPU, etc.) to execute (and/or run) a kernel (e.g., each kernel may encapsulate a function taken from a program) and/or transfer data. Thus, using the compute pipeline 126, a graphics task (e.g., sampling) may be partitioned into work (e.g., kernels, etc.) to be executed in parallel by one or more execution elements (e.g, work items, threads, etc.), wherein one or more execution elements may be grouped together into one or more element blocks (e.g., sub-group, warp, etc.) of an element group (e.g., work group, thread block, etc.), and wherein an element group in the graphics execution model may execute on a GPU/compute device 134.

The illustrated compute pipeline 126 includes a texture sample result module 128 to execute sampling of the texture utilizing the texture sample location data, and/or to provide texture sample result data corresponding to the texture. In one example, the texture sample result module 128 may read and/or receive texture sample location data to execute sampling. The texture sample result module 128 may create, for example, OpenCL kernels to execute sampling, wherein the OpenCL kernels are to be executed by work-items collected into work-groups that are to be executed in the GPU/compute device 134. For example, the texture sample result module 128 may read the sample information buffer to generate OpenCL kernels associated with the texture sample location data. The texture sample result module 128 may be, for example, included in the source code of the application 110, included as an extension for the application 110, implemented in a driver, implemented at least partially in fixed-functionality hardware, and so on, or combinations thereof.

The texture sample result module 128 may provide the result of sampling (e.g., texture sample result data) to the 3D graphics pipeline 112. For example, the texture sample result module 128 may generate a texture layer buffer including the texture sample result data, which may be included as a layer in the G-buffer and used to complete deferred shading. In one example, a render module 116 of the 3D graphics pipeline may composite the frame utilizing the texture sample result data by reading the texture layer buffer and/or by receiving the texture sample result data provided by the texture sample result module 128. The render module 116 may be, for example, included in the source code of the application 110, included as an extension for the application 110, implemented in a driver, implemented at least partially in fixed-functionality hardware, and so on, or combinations thereof.

The compute pipeline 126 includes a fault management module 130 to manage a page fault encountered, for example, before the texture sample result data is provided to the 3D graphics pipeline. For example, the page fault may be encountered when a page is accessed for a texture that is not resident (e.g., loaded) in physical memory, such as in graphics memory. Of note, sampling internal to the compute pipeline 126 may include sampling a virtual texture, which may not be guaranteed to be resident in physical memory. Thus, the page fault may be encountered when a page is accessed for a virtual texture that is not guaranteed to be in memory. Rather than paging-in an entire working set of textures and/or requiring a subset of textures to be resident in memory, the fault management module 130 may be used to page-in (e.g., make resident) portions of the virtual textures that are actually needed such as, for example, exact texels associated with a current texture read. Thus, textures having relatively high resolution may be used without needing to be fully resident in memory and/or without wasting resources such as physical memory.

Moreover, platforms that may dedicate smaller physical memory for textures relative to the size of the textures may benefit from the compute pipeline 126. For example, relatively large textures (e.g., hundreds of megabits, gigabits, larger than dedicated physical memory, etc.) may not be able to be fully resident in memory, while only a subset of textures may need to be used for sampling. Thus, texture streaming involving paging-in exact portions of textures needed to render a current frame, determined from e.g., a texture read and/or a page-fault, may be implemented by the fault management module 130 to accommodate sampling where portions of textures required for rendering are currently actually needed (e.g., on demand). In addition, texture streaming may be implemented by the fault management module 130 to accommodate sampling where portions of textures required for rendering that are actually needed reside in relatively large textures (e.g., larger than dedicated physical memory). The fault management module 130 may be, for example, included in an OS fault handler, scheduler, and/or driver source code, as an extension for the OS fault handler, scheduler, and/or driver, implemented at least partially in fixed-functionality hardware, and so on, or combinations thereof.

Accordingly, the application 110 may not need to be page aware and/or fault aware, wherein the page fault, page table management, and/or page fault management may be hidden from the application 110. Moreover, shared virtual memory (SVM) frameworks may be leveraged to support texture streaming. For example, texture streaming may be supported using Intel SVM (Intel®, a trademark of Intel Corporation), which may allow a CPU and a GPU to have unified memory (e.g., CPU and GPU addresses are unified (e.g., 64 bit)), may allow the GPU to fault on a memory access when textures are not resident, and may allow for a page fault to be managed/handled (e.g., page-in texture, fix page fault, etc.) by an OS/driver. Thus, a GPU may include a faultable compute pipeline 126 supporting virtual textures using SVM.

The compute pipeline 126 also includes a context switch module 132 to switch a compute context associated with the page fault (e.g., faulted compute context). For example, rather than waiting for the page fault to be fixed (e.g., page-in currently needed portions of textures) and/or for a forward progress to be made to reach completion of a current primitive for a switch, the context switch module 132 may switch the faulted compute context to allow further work to be accomplished by the GPU/compute device 134. The context switch module 132 may, for example, switch the faulted compute context for another compute context. The context switch module 132 may also switch back to a faulted compute context when a fault associated with that context has been fixed (e.g., when currently needed portions of textures are paged-in).

In one example, the context switch module 132 may switch from a first faulted compute context to a second compute context e.g., for a compute graphics task such as sampling via the compute pipeline 126, wherein the context switch module 132 may also subsequently switch the second compute context if the second compute context becomes associated with a page fault. In this regard, the context switch module 132 may switch the second compute context that has faulted for another compute context, such as a third compute context (e.g., for a compute graphics task), the first compute context that previously faulted when the fault has been fixed, and so on. The context switch module 132 may also switch a faulted compute context for a 3D graphics task from the 3D pipeline 112, discussed below.

Accordingly, by not stalling the GPU/compute device 134, further work may be done by other contexts that are not dependent on faulted data. For example, the application 110 may execute rendering of other parts of the frame such as particles, shadow maps, etc., while a page is being fixed (e.g., paged-in). In one example related to a windowed application, a 3D graphics task associated with a 3D hardware context that renders a GUI may be scheduled to prevent a window stall and to maintain responsiveness e.g., when a page fault is encountered and is being fixed (e.g., when exact portions of textures actually needed to resolve the page fault are to be paged-in). The context switch module 132 may be, for example, included in an OS fault handler, scheduler, and/or driver source code, as an extension for the OS fault handler, scheduler, and/or driver, implemented at least partially in fixed-functionality hardware, and so on, or combinations thereof. For example, the context switch module 132 may be associated with hardware (e.g., a logic circuit, etc.) on the GPU/compute device 134 to facilitate a relatively high performance context switch.

The compute pipeline 126 may implement one or more throttle mechanisms to allow the compute pipeline 126 to catch up with the 3D graphics pipeline (e.g., with a main 3D thread). The compute pipeline 126 may implement a LOD bias such that relatively coarser mip-map levels are used to lower bandwidth requirement and to relatively speed up sampling. For example, the texture sample location data may include LODs corresponding to a LOD bias, wherein sampling is implemented by the compute pipeline 126 according to the LOD bias. Also, the compute pipeline 126 may not wait for an entire sample information buffer to be completed by dispatching a smaller group of kernels rather than all of the kernels at the same time. For example, the texture sample location data may be provided to the compute pipeline 126 before the entire sample information buffer is generated, wherein the compute pipeline 126 is to dispatch a subset of threads associated with the texture sample location data. In addition, a relatively small group of kernels may be dispatched even if the entire texture sample location data is present for a frame. For example, kernel dispatching may stop and the compute pipeline 126 may move to another frame (e.g., a next frame) when the 3D graphics pipeline 112 needs the texture sample result data (e.g., the end of a present frame) even if all kernels have not been dispatched.

The 3D graphics pipeline 112 may utilize partial results from the compute pipeline 126 to finish the frame together with alternate texture sample result data from relatively higher level (e.g., coarser), resident-guaranteed mip-maps when the texture sample result data is not available within a predetermined period of time. Although the compute pipeline 126 may operate as a streaming system to page-in and sample (and/or filter) required portions of textures as fast as possible, an alternate texture sample result module 118 of the 3D graphics pipeline 112 may generate the alternate texture sample result data as a fallback. The alternate texture sample result module 118 may be, for example, included in the source code of the application 110, included as an extension for the application 110, implemented in a driver, implemented at least partially in fixed-functionality hardware, and so on, or combinations thereof.

In one example, the 3D graphics pipeline 112 may composite a frame using the alternate texture sample result data when the texture sample result data is not available to maintain a desired and/or required frame rate (e.g., sampling work cannot be completed within a predetermine time to keep up with a frame rate). Thus, a main 3D thread may not to wait for work from the compute pipeline 126 to composite the frame. In addition, the alternate texture sample result module 118 may generate relatively lower resolution texture sample result data by sampling a known-resident, higher level (e.g., coarser) mip-map of a virtual texture (e.g., a virtual texture associated with a current page fault). Moreover, the 3D graphics pipeline 112 may blend in streamed, relatively higher resolution layer texture sample result data from the compute pipeline 126 over a period of time when the texture sample result data becomes available to resolve artifacts (e.g., pop-in artifacts).

The 3D graphics pipeline 112 also includes a 3D graphics task module 120 to execute a 3D graphics task (e.g., not involving virtual texture sampling, not associated with a fault, etc.). In one example, the 3D graphics task is executed when a page fault is being managed. The 3D graphics task module 120 may communicate with the GPU/compute device 134 to render other parts of the frame that are independent (e.g., not using virtual textures) such as particle effects, shadow maps, etc. The 3D graphics task module 120 may be, for example, included in the source code of the application 110, included as an extension for the application 110, implemented in a driver, implemented at least partially in fixed-functionality hardware, and so on, or combinations thereof.

The 3D graphics pipeline 112 also includes a wait module 122 to wait the 3D graphics pipeline 112 (e.g., wait to composite the frame, not perform other work, etc.) until, for example, the fault management module 130 fixes the page fault and/or the texture sample result module 128 provides the texture sample result data. In one example, the wait module 122 may facilitate deferred shading by causing the render module 116 to wait until the texture layer buffer and/or the texture sample result data is received from the compute pipeline 126. The wait module 122 may be, for example, included in the source code of the application 110, included as an extension for the application 110, implemented in a driver, implemented at least partially in fixed-functionality hardware, and so on, or combinations thereof.

The wait module 122 may not generate a wait instruction and/or the 3D graphics pipeline 112 may ignore the wait instruction when, for example, a predetermined period of time has passed and/or the alternate texture sample result data is available to composite the frame. For example, the 3D graphics pipeline 112 may wait for approximately 15 ms for the texture sample result data from the compute pipeline 126 when a frame rate is approximately 60 frames per second (fps). The 3D graphics pipeline 112 may use the alternate texture sample result data immediately on expiration of the predetermined period, and/or may wait an additional predetermined period of time (e.g., 1 ms) to no longer wait for the texture sample result data from the compute pipeline 126 and/or to use the alternate texture sample result data. In one example, the alternate texture sample result data may be generated from a non-virtual texture (e.g., a relatively low resolution, known resident mip-map version of a virtual texture).

Accordingly, the wait module 122 may be used to synchronize the 3D graphics pipeline 112 and the compute pipeline 126. For example, the wait module 122 may synchronize the sample information buffer and the resulting texture layer buffer between an OpenGL context and an OpenCL context to ensure that texture sample location data and texture sample result data are generated and/or used in a logical order. In one example, synchronization may be accomplished using a Grand Central Dispatch (GCD) provided on, for example, an OS X platform (OS X®, a trademark of Apple Inc.). Synchronization may also be accomplished using a cl_khr_gl_event extension (if supported) to synchronize resources between GL and CL by linking GL fences to CL events. Synchronization may further be accomplished using an explicit finish (e.g., glFinish) to synchronize the 3D Graphics pipeline 112 and the context pipeline 126, for example where risk of a driver stall may be tolerated.

Figure 2:
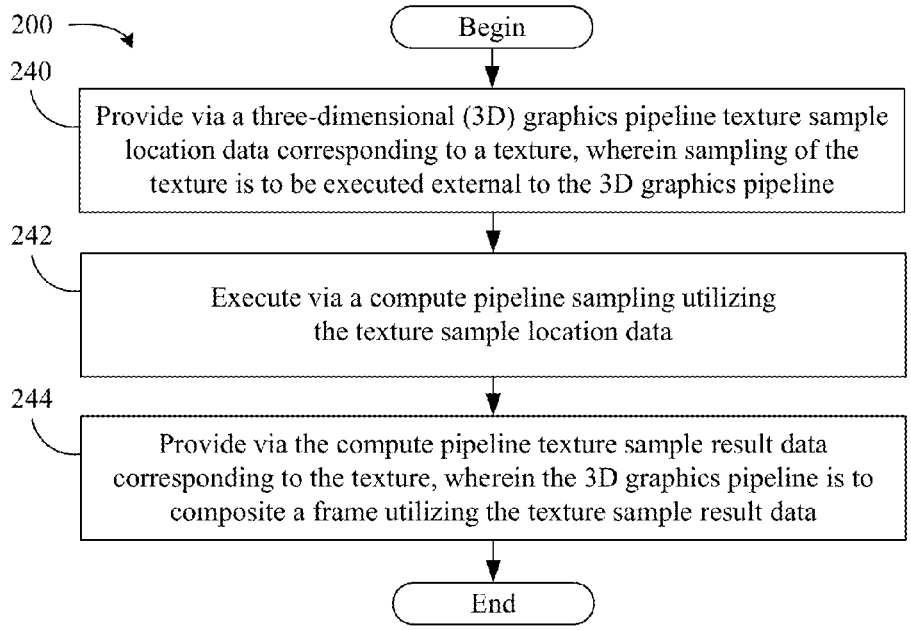
FIG. 2 is a flowchart of an example of a method to perform sampling, fault management, and/or context switching according to an embodiment.

FIG. 2 shows a method 200 to sample, manage a fault, and/or context switch according to an embodiment. The method 200 may be implemented as a set of logic instructions stored in a machine- or computer-readable storage medium such as random access memory (RAM), read only memory (ROM), programmable ROM (PROM), flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), CMOS or transistor-transistor logic (TTL) technology, or any combination thereof. For example, computer program code to carry out operations shown in the method 200 may be written in any combination of one or more programming languages, including an object oriented programming language such as C++ or the like and conventional procedural programming languages, such as the "C" programming language or similar programming languages. Moreover, the method 200 may be implemented using any of the herein mentioned circuit technologies.

The illustrated processing block 240 includes providing, via a three-dimensional (3D) graphics pipeline, texture sample location data corresponding to a texture, wherein sampling of the texture is executed external to the 3D graphics pipeline. For example, the 3D graphics pipeline may include the 3D graphics pipeline 112 (FIG. 1), discussed above. Thus, the processing block 240 may include generating, via the 3D graphics pipeline, a sample information buffer including the texture sample location data. For example, the processing block 240 may include supporting, via the 3D graphics pipeline, a Graphics Library (GL) 3D application programming interface (API) to generate a sample information buffer including texture sample location data such as, for example, a uv coordinate, a gradient, a texture handle, level of detail (LOD), and so on, or combinations thereof.

The illustrated processing block 242 includes executing, via a compute pipeline, sampling utilizing the texture sample location data. For example, the compute pipeline may include the compute pipeline 126 (FIG. 1), discussed above. Thus, the processing block 242 may include reading, via the compute pipeline, the sample information buffer to execute the sampling and/or generating a texture layer buffer including the texture sample result data. For example, the processing block 242 may include supporting, via the compute pipeline, a compute API (e.g., an OpenCL API) to generate the texture layer buffer holding any data in the texture that is to be used to finalize a frame (e.g., color data, etc.).

The processing block 242 may include managing, via the compute pipeline, a page fault wherein the page fault and/or management of the page fault may be hidden from a graphics application (e.g., a 3D graphics application). Of note, the sampling may include a texture that is not guaranteed to be in memory (e.g., virtual texture). Thus, rather than paging-in an entire working set of textures and/or requiring a subset of textures to be resident in memory, the compute pipeline may page-in (e.g., make resident) virtual textures that are actually needed (e.g., on demand) such as, for example, exact portions of textures associated with a current texture read. In addition, texture streaming involving paging-in exact textures needed to render a current frame determined from e.g., a current texture read and/or a page-fault, may be implemented to accommodate sampling where portions of textures required for rendering are currently actually needed and/or where portions of textures required for rendering that are actually needed reside in relatively large textures (e.g., larger than dedicated physical memory).

The processing block 242 may include switching, via the compute pipeline, a compute context associated with the page fault to allow further work to be executed and/or to prevent a GPU device stall in response to the page fault. For example, rather than waiting for the page fault to be fixed (e.g., page-in needed textures) and/or forward progress to be made to reach completion of a current primitive, the compute pipeline may switch out the faulting compute context to allow another graphics task to be executed (e.g., scheduled, switched in, etc.). Thus, the GPU device may not stall in response to a page fault, and may allow further GPU work such as rendering particle effects, rendering shadow maps, etc. to be done by other contexts while the pages are being fixed. In one example for a windowed application, a 3D graphics task associates with a 3D hardware context that renders a GUI may be scheduled to prevent a window stall and to maintain responsiveness. The compute pipeline may also schedule the switched and/or faulted compute context for resumed execution when the page fault is fixed (e.g., when exact portions of textures actually needed to address the current page fault are to be paged-in).

The processing block 242 may include implementing, via the compute pipeline, a level of detail (LOD) bias and/or a thread subset dispatch to allow the compute pipeline to catch up with the 3D graphics pipeline. The compute pipeline may implement a LOD bias such that relatively coarser mip-map levels are used to lower a bandwidth requirement and to relatively speed up sampling. Also, the compute pipeline may not wait for an entire sample information buffer to be completed by dispatching a smaller group of kernels rather than dispatching all of the kernels at the same time. In addition, the compute pipeline may dispatch a relatively small group of kernels even if the entire location data is present.

The illustrated processing block 244 includes providing, via the compute pipeline, texture sample result data corresponding to the texture, wherein the 3D graphics pipeline is to composite a frame utilizing the texture sample result data. Thus, the processing block 244 may include reading, via the 3D graphics pipeline, the texture layer buffer to composite the frame. It should be understood that the processing blocks 240, 242, and/or 244 may include one or more operations in any combination. In one example, the method 200 may include executing, via the 3D graphics pipeline, a graphics task not involving texture sampling (e.g., not involving sampling of a virtual texture) when the 3D graphics pipeline provides the texture sampling location data at the processing block 240, when the compute pipeline manages the page fault at the processing block 240, and so on, or combinations thereof.

In another example, the method 200 may include generating, via the 3D graphics pipeline, alternate texture sample result data to composite the frame when the texture sample result data is not available within a predetermined period at the processing block 244. For example, sampling, via the 3D graphics pipeline, of a resident coarser mip-map of the texture (e.g., sampling of a non-virtual texture corresponding to a virtual texture) to generate the alternate texture sample result data may be accomplished at the processing block 244. In addition, the processing blocks 240, 242, and/or 244 may include waiting the 3D graphics pipeline e.g., until the compute pipeline fixes the page fault to composite the frame, wherein the waiting synchronizes the 3D graphics pipeline with the compute pipeline without an explicit finish.

Figure 3:
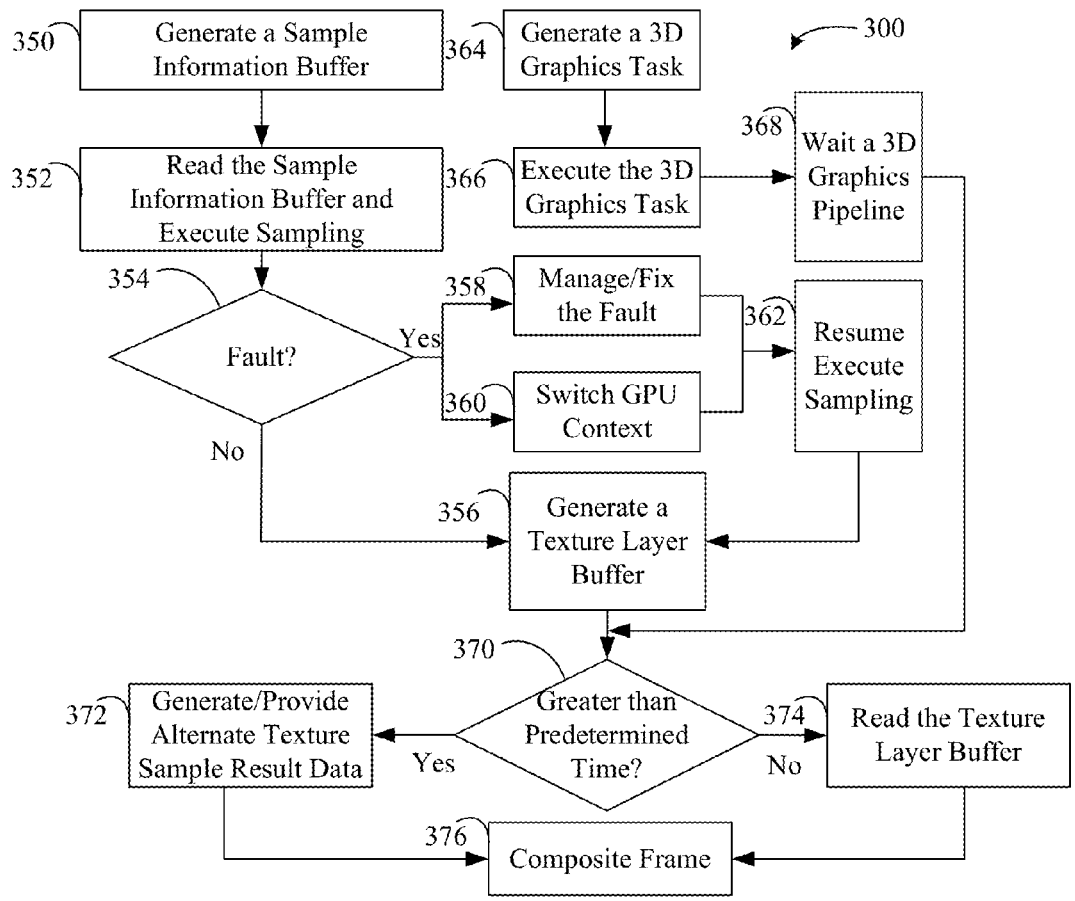
FIG. 3 is a flowchart of an example of a method to perform sampling, fault management, and/or context switching according to an embodiment.

Turning now to FIG. 3, a method 300 is shown to sample, manage a fault, and/or context switch according to an embodiment. The method 300 may be implemented using any of the herein mentioned technologies such as, for example, a set of logic instructions stored in a machine- or computer-readable storage medium. The illustrated processing block 350 may generate a sample information buffer via a three-dimensional (3D) graphics pipeline. The 3D graphics pipeline may include, for example, the 3D graphics pipeline 112 (FIG. 1), discussed above. The sample information buffer may be provided to processing block 352, which may read the sample information buffer and execute sampling via a compute pipeline. The compute pipeline may include, for example, the compute pipeline 126 (FIG. 1), discussed above.

A determination may be made at block 354 whether there is a page fault associated with the sampling via the compute pipeline. For example, the page fault may involve a current texture read for a virtual texture that is not guaranteed to be resident in memory and that is not actually resident in memory but is associated with the texture read. If there is no page fault, a texture layer buffer is generated including texture sample result data (e.g., color, etc.) at processing block 356 via the compute pipeline. If there is a page fault associated with the sampling, processing block 358 manages and/or fixes the page fault via the compute pipeline. For example, the processing block 358 may page-in portions of textures or exact texels actually needed to resolve the page fault determined in response to e.g., a current texture read and/or page fault. In addition, processing block 360 may switch the context associated with the page fault via the compute pipeline to allow another graphics task (e.g., not involving texture sampling, associated with any context that is not currently waiting on a fault, etc.) to be executed to prevent a stall in response to the page fault. When the page fault is resolved, the faulting context may be switched back to resume sampling at processing block 362 via the compute pipeline. Texture sample result data that is generated may be held in a texture layer buffer generated at the processing block 356 via the compute pipeline.

Meanwhile, a 3D graphics task may be generated at processing block 364 via the 3D pipeline. The 3D graphics task may be executed at processing block 366 via the 3D pipeline when, for example, the compute pipeline manages the page fault. The processing block 368 may wait the 3D pipeline, for example after completing the processing of one or more 3D graphics tasks at the processing block 366. A determination may be made at block 370 whether the texture layer buffer is to be provided to the 3D graphics pipeline at a time greater than a predetermined period of time. If so, processing block 372 generates alternate texture sample result data and/or provides the alternate texture sample result data to processing block 376 via the 3D pipeline, wherein the processing block 376 composites (e.g., finishes) the frame using the alternate texture sample result data via the 3D pipeline. If not, processing block 374 reads the texture layer buffer and provides texture sample result data to the processing block 376 to composite the frame utilizing the texture sample result data via the 3D pipeline. In addition, the alternate texture sample result data and the texture sample result data may be used together by implementing, for example, a blending operation via the 3D pipeline.

Figure 4:
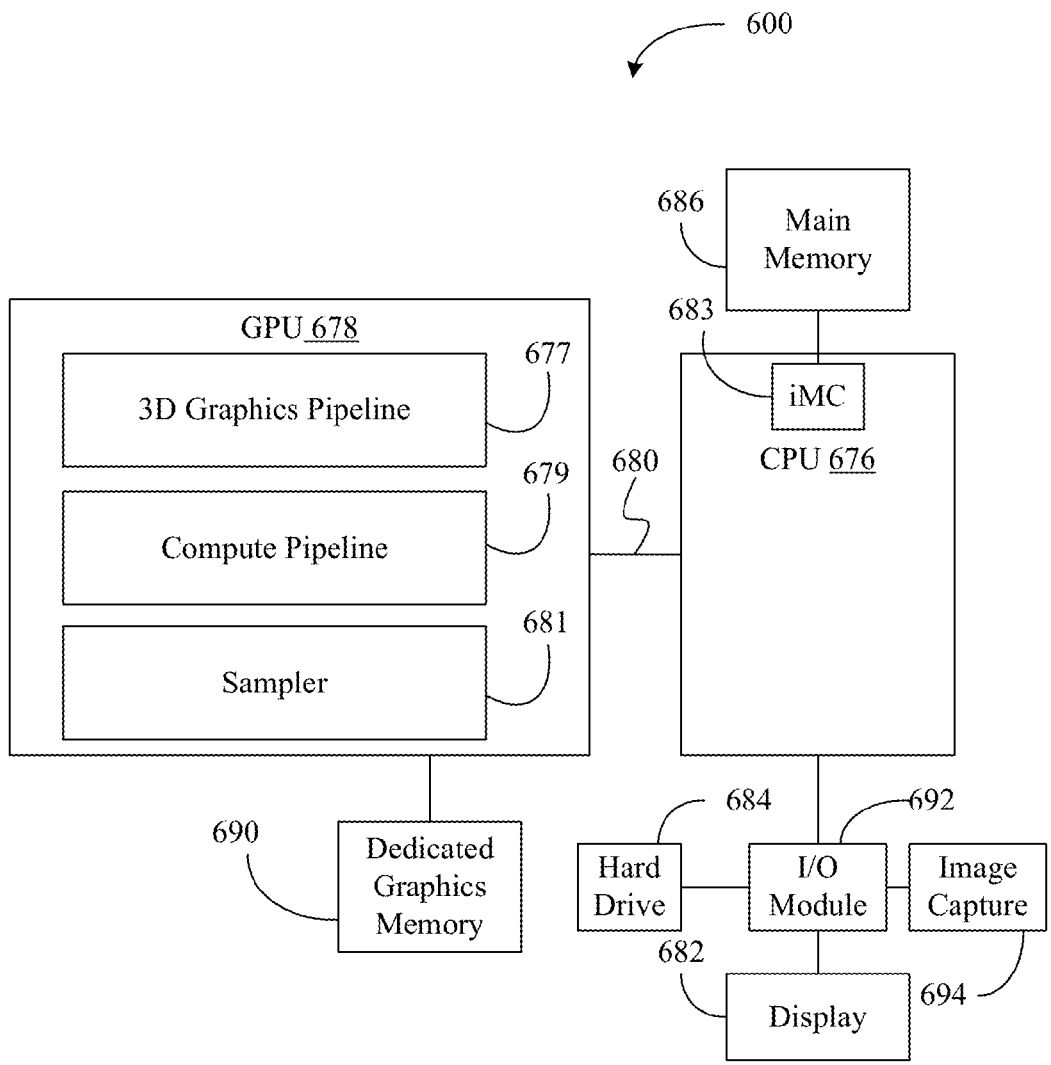
FIG. 4 is a block diagram of an example of a sampling, fault management, and/or context switching computing system according to an embodiment.

Turning now to FIG. 4, a block operation computing system 600 is shown according to an embodiment. The computing system 600 may be part of a mobile platform such as a laptop, PDA, wireless smart phone, media player, imaging device, MID, gaming console, wearable computer, any smart device such as a smart phone, smart tablet and so on, or any combination thereof. The computing system 600 may also be part of a fixed platform such as a personal computer (PC), smart TV, server, workstation, etc. The illustrated computing system 600 includes one or more CPUs (central processing units) 676, a display device 682, a hard disk drive 684 and main memory 686, which could include, for example, DDR modules. The modules of the system memory 686 may be incorporated into a SIMM (single in-line memory module), DIMM (dual in-line memory module), SODIMM (small outline DIMM), and so on.

The computing system 600 may include a graphics bus (e.g., slot) 680, wherein a graphics card (not shown) containing a graphics processing unit (GPU) 678 and dedicated graphics memory 690 could be coupled (e.g., plugged into) to the graphics bus 680. For example, the graphics bus 680 could include a PCI Express Graphics (PEG, e.g., Peripheral Components Interconnect/PCI Express x16 Graphics 150W-ATX Specification 1.0, PCI Special Interest Group) bus, an Accelerated Graphics Port (e.g., AGP V3.0 Interface Specification, September 2002) bus, and so on. The CPUs 676 may have an integrated memory controller (iMC) 684, and one or more processor cores (not shown) to execute one or more drivers associated with a host OS (operating system) and/or application software, wherein each core may be fully functional with instruction fetch units, instruction decoders, level one (L1) cache, execution units, and so on. The CPUs 676 could alternatively communicate with an off-chip variation of the iMC 683, also known as a Northbridge, via a front side bus. The illustrated CPUs 676 communicate with an input/output (I/O) module 692, also known as a Southbridge, via a hub bus. The iMC 683/CPUs 676 and the I/O module 692 are sometimes referred to as a chipset, or may be implemented together as a system-on-chip (SoC) architecture.

The illustrated computing system 600 also includes a three-dimensional (3D) graphics pipeline 677. For example, the 3D graphics pipeline 677 may include the 3D graphics pipeline 112 (FIG. 1), discussed above. Thus, the 3D graphics pipeline 677 may, for example, provide texture sample location data corresponding to a texture, wherein sampling of the texture is executed external to the 3D graphics pipeline. In addition, the computing system 600 includes a compute pipeline 679. For example, the compute pipeline 679 may include the compute pipeline 126 (FIG. 1), discussed above. Thus, the compute pipeline 679 may, for example, execute sampling of the texture utilizing the texture sample location data, and/or provide the texture sample result data corresponding to the texture. The 3D graphics pipeline 677 and the compute pipeline 679 may be implemented in a dedicated graphics and/or integrated graphics format. For example, the 3D graphics pipeline 677, the compute pipeline 679, and a bus may be part of the same die in an integrated graphics format. However, one or more components of the 3D graphics pipeline 677 and/or the compute pipeline 679 may be remotely located, such as in the CPU 676.

Of note, the compute pipeline 679 may manage a page fault associated with the texture (e.g., a virtual texture) when a texture is not resident in physical memory, such as in the main memory 686, in the dedicated graphics memory 690, and so on, or combinations thereof. In addition, the compute pipeline 679 may switch a faulted context, for example at an EU instruction level (e.g., providing relatively finer granularity). The compute pipeline 679 may also include and/or leverage the hardware sampler 681 to sample textures, which may be shared among the 3D graphics pipeline 677 and the compute pipeline 679. Thus, an application may not need to be page aware and/or fault aware, wherein a page fault and/or management of the page fault may be hidden from the application. In addition, the page fault may not cause a stall since a context associated with the page fault (e.g., faulting context) may be switched (e.g., substantially immediately switched) without waiting for sufficient forward progress to reach completion of a current primitive, allowing another graphics task (e.g., not involving texture sampling, a graphics task associated with any context that is not currently waiting on a fault, etc.) to be executed.

In addition, the use of GPU hardware may allow for further sampling advantages such as support for nearest filtering, bilinear filtering, trilinear filtering, anisotropic filtering, and so on. Also, gradient input may be supported and missing texture formats or LOD bias may be supported. For example, tex3Dgrad may be supported to determine a LOD for mip-mapping and/or filtering.

Moreover, a compression advantage may include on-demand decompression at, for example, a 16K×16K granularity. In addition, sampling may be accomplished from a memory-mapped network file that may include a local/remote server to decompress relatively large textures (e.g., satellite imagery). Also, a format (e.g., JPEG) may be decompressed and shared with a work group via shared memory. LOD fallback advantages may include a fallback to a guaranteed resident page if a page cannot be streamed on time by treating relatively coarser mip levels as a desired (e.g., normal) level, and/or by guaranteeing resident mip-maps. Also, where a shader is fault aware, a non-blocking sample instruction may be used to return a failure if the sampling caused a page fault to allow the shader to try a relatively coarser mip level. Streaming advantages may include providing relatively small load (e.g., startup) time due to relatively small texture preloading. Also, a relatively thin client (e.g., for networked applications) may be provided and/or texture assets may not be required on a hard drive.

In addition, a webkit may be utilized. For example, an open source webkit rendering module may enable the CPU 676 to render tiles directly to shared memory, wherein tiles and images may be directly accessed via samplers, such as the GPU hardware sampler 681 which may be faultable. Also, checker box texture may be utilized by a 3D context (or another compute context) rather than LOD where streaming does not keep up with a frame rate. Terrain rendering advantages may include relatively simplified terrain rendering using relatively large height maps by not requiring the application to dice up viewable tiles and updating memory (e.g., VRAM).

Figure 5:
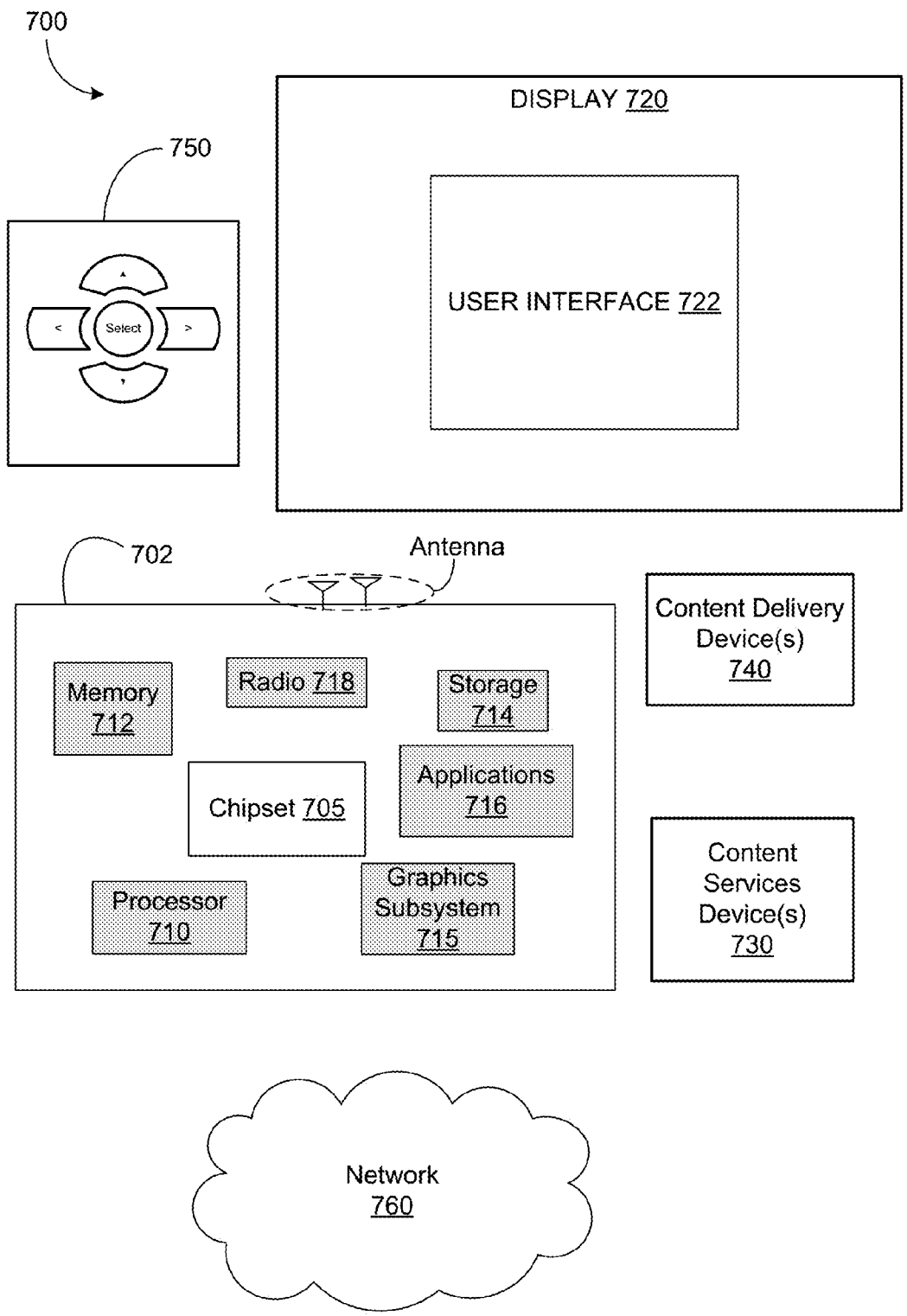
FIG. 5 is a block diagram of an example of a system including a three-dimensional (3D) pipeline and a compute pipeline according to an embodiment.

FIG. 5 illustrates an embodiment of a system 700 that may implement a three-dimensional (3D) graphics pipeline and a compute pipeline according to an embodiment. For example, the 3D graphics pipeline may include the 3D graphics pipeline 112 (FIG. 1) and/or the 3D graphics pipeline 677 (FIG. 4), discussed above. In addition, the compute pipeline may include the compute pipeline 126 (FIG. 1) and/or the compute pipeline 679 (FIG. 4), discussed above. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, gaming console, and so on.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) and/or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
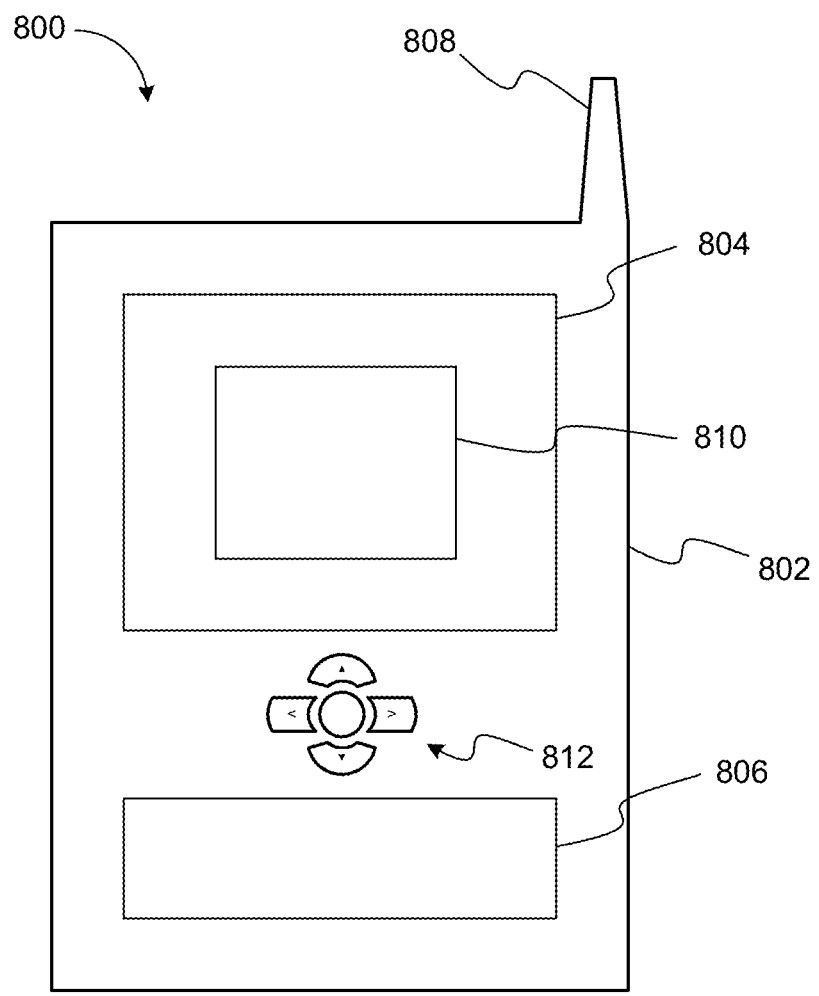
FIG. 6 is a block diagram of an example of a system having a small form factor according to an embodiment.

As described above, system 700 may be embodied in varying physical styles or form factors. FIG. 6 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Additional Notes and Examples

Examples may include subject matter such as a method, means for performing acts of the method, at least one machine-readable medium including instructions that, when performed by a machine cause the machine to performs acts of the method, or an apparatus or system to sample a texture, manage a fault, and/or context switch according to embodiments and examples described herein.

Example 1 may include an apparatus including one or more processors, which may include one or more pipelines. The apparatus may include a three-dimensional (3D) graphics pipeline including a texture sample location module to provide texture sample location data corresponding to a texture, wherein sampling of the texture is to be executed external to the 3D graphics pipeline. The apparatus may include a compute pipeline including a texture sample result module to execute sampling of the texture utilizing the texture sample location data and/or to provide texture sample result data corresponding to the texture, wherein a render module of the 3D graphics pipeline is to composite a frame utilizing the texture sample result data, and/or wherein the frame is to be displayed by the display.

Example 2 may include the subject matter of Example 1 and further optionally may include the texture sample location module is to generate a sample information buffer including the texture sample location data, wherein the texture sample result module is to read the sample information buffer to execute the sampling and/or is to generate a texture layer buffer including the texture sample result data, and/or wherein the render module is to read the texture layer buffer to composite the frame.

Example 3 may include the subject matter of any of Example 1 to Example 2 and further optionally may include the 3D graphics pipeline is to support a Graphics Library (GL) 3D application programming interface (API) to generate the sample information buffer including one or more of a uv coordinate, a gradient and/or a texture handle, and/or wherein the compute pipeline is to support a compute API to execute the sampling and/or to generate the texture layer buffer including color data.

Example 4 may include the subject matter of any of Example 1 to Example 3 and further optionally may include the compute pipeline includes a fault management module to manage a page fault, wherein one or more of the page fault and/or management of the page fault is to be hidden from a graphics application.

Example 5 may include the subject matter of any of Example 1 to Example 4 and further optionally may include the compute pipeline includes a context switch module to switch a compute context associated with the page fault to allow a graphics task not associated with the page fault to be executed and/or to prevent a stall in response to the page fault.

Example 6 may include the subject matter of any of Example 1 to Example 5 and further optionally may include the 3D graphics pipeline includes a 3D context graphics task module to execute a 3D graphics task not associated with the page fault when the fault management module is to manage the page fault.

Example 7 may include the subject matter of any of Example 1 to Example 6 and further optionally may include the 3D graphics pipeline includes an alternate texture sample result module to generate alternate texture sample result data to composite the frame when the texture sample return data is not available within a predetermined period.

Example 8 may include the subject matter of any of Example 1 to Example 7 and further optionally may include the alternate texture sample result module is to execute sampling of a resident relatively coarser mip-map of the texture to generate the alternate texture sample result data.

Example 9 may include the subject matter of any of Example 1 to Example 8 and further optionally may include the 3D graphics pipeline includes a wait module to wait the 3D graphics pipeline until the fault management module is to fix the page fault to composite the frame, wherein the wait is to synchronize the 3D graphics pipeline with the compute pipeline without an explicit finish.

Example 10 may include the subject matter of any of Example 1 to Example 9 and further optionally may include the compute pipeline is to implement one or more of a level of detail (LOD) bias and/or a thread subset dispatch to allow the compute pipeline to catch up with the 3D graphics pipeline.

Example 11 may include a method to sample a texture, manage a fault, and/or context switch according to embodiments and examples described herein. The method may include providing via a three-dimensional (3D) graphics pipeline texture sample location data corresponding to a texture, wherein sampling of the texture is executed external to the 3D graphics pipeline. The method may include executing via a compute pipeline sampling utilizing the texture sample location data. The method may include providing via the compute pipeline texture sample result data corresponding to the texture, wherein the 3D graphics pipeline is to composite a frame utilizing the texture sample result data.

Example 12 may include the subject matter of Example 11 and further optionally may include generating via the 3D graphics pipeline a sample information buffer including the texture sample location data, reading via the compute pipeline the sample information buffer to execute the sampling and/or generating a texture layer buffer including texture sample result data, and/or reading via the 3D graphics pipeline the texture layer buffer to composite the frame.

Example 13 may include the subject matter of any of Example 11 to Example 12 and further optionally may include supporting via the 3D graphics pipeline a Graphics Library (GL) 3D application programming interface (API) to generate the sample information buffer including one or more of a uv coordinate, a gradient and/or a texture handle, and/or supporting via the compute pipeline a compute API to generate the texture layer buffer including color data.

Example 14 may include the subject matter of any of Example 11 to Example 13 and further optionally may include managing via the compute pipeline a page fault, wherein one or more of the page fault and/or management of the page fault is hidden from a graphics application.

Example 15 may include the subject matter of any of Example 11 to Example 14 and further optionally may include switching via the compute pipeline a compute context associated with the page fault to allow a graphics task not associated with the page fault to be executed and/or to prevent a stall in response to the page fault.

Example 16 may include the subject matter of any of Example 11 to Example 15 and further optionally may include executing via the 3D graphics pipeline a 3D graphics task not associated with the page fault when the compute pipeline manages the page fault.

Example 17 may include the subject matter of any of Example 11 to Example 16 and further optionally may include generating via the 3D graphics pipeline alternate texture sample result data to composite the frame when the texture sample result data is not available within a predetermined period.

Example 18 may include the subject matter of any of Example 11 to Example 17 and further optionally may include executing sampling of a resident relatively coarser mip-map of the texture to generate the alternate texture sample result data.

Example 19 may include the subject matter of any of Example 11 to Example 18 and further optionally may include waiting the 3D graphics pipeline until the page fault is fixed to composite the frame, wherein the waiting is to synchronize the 3D graphics pipeline with the compute pipeline without an explicit finish.

Example 20 may include the subject matter of any of Example 11 to Example 19 and further optionally may include implementing via the compute pipeline one or more of a level of detail (LOD) bias and/or a thread subset dispatch to allow the compute pipeline to catch up with the 3D graphics pipeline.

Example 21 may include at least one computer readable storage medium comprising one or more instructions that when executed on a computing device cause the computing device to provide via a three-dimensional (3D) graphics pipeline texture sample location data corresponding to a texture, wherein sampling of the texture is to be executed external to the 3D graphics pipeline, execute via a compute pipeline sampling utilizing the texture sample location data, and/or provide via the compute pipeline texture sample result data corresponding to the texture, wherein the 3D graphics pipeline is to composite a frame utilizing the texture sample result data.

Example 22 may include the subject matter of Example 21 and further optionally may include when executed the one or more instructions cause the computing device to generate via the 3D graphics pipeline a sample information buffer including the texture sample location data, read via the compute pipeline the sample information buffer to execute the sampling and/or generate a texture layer buffer including the texture sample result data, and/or read via the 3D graphics pipeline the texture layer buffer to composite the frame.

Example 23 may include the subject matter of any of Example 21 to Example 22 and further optionally may include when executed the one or more instructions cause the computing device to support via the 3D graphics pipeline a Graphics Library (GL) 3D application programming interface (API) to generate the sample information buffer including one or more of a uv coordinate, a gradient and/or a texture handle, and/or support via the compute pipeline a compute API to generate the texture layer buffer including color data.

Example 24 may include the subject matter of any of Example 21 to Example 23 and further optionally may include when executed the one or more instructions cause the computing device to manage via the compute pipeline a page fault, wherein one or more of the page fault and/or management of the page fault is to be hidden from a graphics application.

Example 25 may include the subject matter of any of Example 21 to Example 24 and further optionally may include when executed the one or more instructions cause the computing device to switch via the compute pipeline a compute context associated with the page fault to allow a graphics task not associated with the page fault to be executed and/or to prevent a stall in response to the page fault.

Example 26 may include the subject matter of any of Example 21 to Example 25 and further optionally may include when executed the one or more instructions cause the computing device to execute via the 3D graphics pipeline a 3D graphics task not associated with the page fault when the compute pipeline is to manage the page fault.

Example 27 may include the subject matter of any of Example 21 to Example 26 and further optionally may include when executed the one or more instructions cause the computing device to generate via the 3D graphics pipeline alternate texture sample result data to composite the frame when the texture sample result data is not available within a predetermined period.

Example 28 may include the subject matter of any of Example 21 to Example 27 and further optionally may include when executed the one or more instructions cause the computing device to execute sampling of a resident relatively coarser mip-map of the texture to generate the alternate texture sample result data.

Example 29 may include the subject matter of any of Example 21 to Example 28 and further optionally may include when executed the one or more instructions cause the computing device to wait the 3D graphics pipeline until the page fault is fixed to composite the frame, wherein the wait is to synchronize the 3D graphics pipeline with the compute pipeline without an explicit finish.

Example 30 may include the subject matter of any of Example 21 to Example 29 and further optionally may include when executed the one or more instructions cause the computing device to implement via the compute pipeline one or more of a level of detail (LOD) bias and/or a thread subset dispatch to allow the compute pipeline to catch up with the 3D graphics pipeline.

Example 31 may include an apparatus including processor means, which may include one or more pipelines. The apparatus may include means for providing via a three-dimensional (3D) graphics pipeline texture sample location data corresponding to a texture, wherein sampling of the texture is executed external to the 3D graphics pipeline. The apparatus may include means for executing via a compute pipeline sampling utilizing the texture sample location data. The apparatus may include means for providing via the compute pipeline texture sample result data corresponding to the texture, wherein the 3D graphics pipeline is to composite a frame utilizing the texture sample result data, and/or wherein the frame is to be displayed by the display means.

Example 32 may include the subject matter of Example 31 and further optionally may include means for generating via the 3D graphics pipeline a sample information buffer including the texture sample location data, means for reading via the compute pipeline the sample information buffer to execute the sampling and/or generating a texture layer buffer including texture sample result data, and/or means for reading via the 3D graphics pipeline the texture layer buffer to composite the frame.

Example 33 may include the subject matter of any of Example 31 to Example 32 and further optionally may include means for supporting via the 3D graphics pipeline a Graphics Library (GL) 3D application programming interface (API) to generate the sample information buffer including one or more of a uv coordinate, a gradient and/or a texture handle, and/or means for supporting via the compute pipeline a compute API to generate the texture layer buffer including color data.

Example 34 may include the subject matter of any of Example 31 to Example 33 and further optionally may include means for managing via the compute pipeline a page fault, wherein one or more of the page fault and/or management of the page fault is hidden from a graphics application.

Example 35 may include the subject matter of any of Example 31 to Example 34 and further optionally may include means for switching via the compute pipeline a compute context associated with the page fault to allow a graphics task not associated with the page fault to be executed and/or to prevent a stall in response to the page fault.

Example 36 may include the subject matter of any of Example 31 to Example 35 and further optionally may include means for executing via the 3D graphics pipeline a 3D graphics task not associated with the page fault when the compute pipeline manages the page fault.

Example 37 may include the subject matter of any of Example 31 to Example 36 and further optionally may include means for generating via the 3D graphics pipeline alternate texture sample result data to composite the frame when the texture sample result data is not available within a predetermined period.

Example 38 may include the subject matter of any of Example 31 to Example 37 and further optionally may include means for executing sampling of a resident relatively coarser mip-map of the texture to generate the alternate texture sample result data.

Example 39 may include the subject matter of any of Example 31 to Example 38 and further optionally may include means for waiting the 3D graphics pipeline until the page fault is fixed to composite the frame, wherein the waiting is to synchronize the 3D graphics pipeline with the compute pipeline without an explicit finish.

Example 40 may include the subject matter of any of Example 41 to Example 49 and further optionally may include means for implementing via the compute pipeline one or more of a level of detail (LOD) bias and/or a thread subset dispatch to allow the compute pipeline to catch up with the 3D graphics pipeline.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated. Additionally, it is understood that the indefinite articles "a" or "an" carries the meaning of "one or more" or "at least one". In addition, as used in this application and in the claims, a list of items joined by the terms "one or more of" and "at least one of" can mean any combination of the listed terms. For example, "one or more of A, B or C" or "one or more of A, B and C" can mean A; B; C; A and B; A and C; B and C; or A, B and C.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. An apparatus comprising:
one or more processors including one or more pipelines, the one or more pipelines including:
a three-dimensional (3D) graphics pipeline including:
a texture sample location module to provide texture sample location data corresponding to a texture, wherein sampling of the texture is to be executed external to the 3D graphics pipeline; and
an alternate texture sample result module to generate alternate texture sample result data to composite a frame when texture sample result data corresponding to the texture is not available within a predetermined period; and
a compute pipeline including:
a texture sample result module to execute sampling of the texture utilizing the texture sample location data and to provide the texture sample result data corresponding to the texture, wherein a render module of the 3D graphics pipeline is to composite the frame utilizing one or more of the texture sample result data and the alternate texture sample result data; and
a fault management module to manage a page fault, wherein one or more of the page fault and management of the page fault is to be hidden from a graphics application.

2. The apparatus of claim 1, wherein:
the texture sample location module is to generate a sample information buffer including the texture sample location data;
the texture sample result module is to read the sample information buffer to execute the sampling and is to generate a texture layer buffer including the texture sample result data; and
the render module is to read the texture layer buffer to composite the frame.

3. The apparatus of claim 2, wherein:
the 3D graphics pipeline is to support a Graphics Library (GL) 3D application programming interface (API) to generate the sample information buffer including one or more of a uv coordinate, a gradient and a texture handle; and
the compute pipeline is to support a compute API to execute the sampling and to generate the texture layer buffer including color data.

4. The apparatus of claim 1, wherein the compute pipeline includes a context switch module to switch a compute context associated with the page fault to allow a graphics task not associated with the page fault to be executed and to prevent a stall in response to the page fault.

5. The apparatus of claim 1, wherein the 3D graphics pipeline includes a 3D graphics task module to execute a 3D graphics task not associated with the page fault when the fault management module is to manage the page fault.

6. The apparatus of claim 1, wherein the alternate texture sample result data module is to execute sampling of a resident relatively coarser mip-map of the texture to generate the alternate texture sample result data.

7. The apparatus of claim 1, wherein the 3D graphics pipeline includes a wait module to wait the 3D graphics pipeline until the fault management module is to fix the page fault to composite the frame, wherein the wait is to synchronize the 3D graphics pipeline with the compute pipeline without an explicit finish.

8. The apparatus of claim 1, wherein the compute pipeline is to implement one or more of a level of detail (LOD) bias and a thread subset dispatch to allow the compute pipeline to catch up with the 3D graphics pipeline.

9. A method comprising:
providing via a three-dimensional (3D) graphics pipeline texture sample location data corresponding to a texture, wherein sampling of the texture is executed external to the 3D graphics pipeline;
generating via the 3D graphics pipeline alternate texture sample result data to composite a frame when texture sample result data corresponding to the texture is not available within a predetermined period;
executing via a compute pipeline sampling utilizing the texture sample location data;
providing via the compute pipeline the texture sample result data corresponding to the texture, wherein the 3D graphics pipeline is to composite the frame utilizing one or more of the texture sample result data and the alternate texture sample result data; and
managing via the compute pipeline a page fault, wherein one or more of the page fault and management of the page fault is hidden from a graphics application.

10. The method of claim 9, further including:
generating via the 3D graphics pipeline a sample information buffer including the texture sample location data;
reading via the compute pipeline the sample information buffer to execute the sampling and generating a texture layer buffer including texture sample result data; and
reading via the 3D graphics pipeline the texture layer buffer to composite the frame.

11. The method of claim 10, further including:
supporting via the 3D graphics pipeline a Graphics Library (GL) 3D application programming interface (API) to generate the sample information buffer including one or more of a uv coordinate, a gradient and a texture handle; and
supporting via the compute pipeline a compute API to generate the texture layer buffer including color data.

12. The method of claim 9, further including switching via the compute pipeline a compute context associated with the page fault to allow a graphics task not associated with the page fault to be executed and to prevent a stall in response to the page fault.

13. The method of claim 9, further including executing via the 3D graphics pipeline a 3D graphics task not associated with the page fault when the compute pipeline manages the page fault.

14. At least one non-transitory computer readable storage medium comprising one or more instructions that when executed on a computing device cause the computing device to:
provide via a three-dimensional (3D) graphics pipeline texture sample location data corresponding to a texture, wherein sampling of the texture is to be executed external to the 3D graphics pipeline;
generate via the 3D graphics pipeline alternate texture sample result data to composite a frame when texture sample result data corresponding to the texture is not available within a predetermined period;
execute via a compute pipeline sampling utilizing the texture sample location data;
provide via the compute pipeline the texture sample result data corresponding to the texture, wherein the 3D graphics pipeline is to composite the frame utilizing one or more of the texture sample result data and the alternate texture sample result data; and
manage via the compute pipeline a page fault, wherein one or more of the page fault and management of the page fault is hidden from a graphics application.

15. The at least one medium of claim 14, wherein when executed the one or more instructions cause the computing device to:
generate via the 3D graphics pipeline a sample information buffer including the texture sample location data;
read via the compute pipeline the sample information buffer to execute the sampling and generate a texture layer buffer including the texture sample result data; and
read via the 3D graphics pipeline the texture layer buffer to composite the frame.

16. The at least one medium of claim 15, wherein when executed the one or more instructions cause the computing device to:
support via the 3D graphics pipeline a Graphics Library (GL) 3D application programming interface (API) to generate the sample information buffer including one or more of a uv coordinate, a gradient and a texture handle; and
support via the compute pipeline a compute API to generate the texture layer buffer including color data.

17. The at least one medium of claim 14, wherein when executed the one or more instructions cause the computing device to switch via the compute pipeline a compute context associated with the page fault to allow a graphics task not associated with the page fault to be executed and to prevent a stall in response to the page fault.

18. The at least one medium of claim 14, wherein when executed the one or more instructions cause the computing device to execute via the 3D graphics pipeline a 3D graphics task not associated with the page fault when the compute pipeline is to manage the page fault.

19. An apparatus comprising:
one or more processors including one or more pipelines, the one or more pipelines including:
a three-dimensional (3D) graphics pipeline including:
a texture sample location module to provide texture sample location data corresponding to a texture, wherein sampling of the texture is to be executed external to the 3D graphics pipeline; and
a wait module to wait the 3D graphics pipeline until a fault management module is to fix a page fault to composite a frame, wherein the wait is to synchronize the 3D graphics pipeline with a compute pipeline without an explicit finish; and
the compute pipeline including:
a texture sample result module to execute sampling of the texture utilizing the texture sample location data and to provide texture sample result data corresponding to the texture, wherein a render module of the 3D graphics pipeline is to composite a frame utilizing the texture sample result data; and
the fault management module to manage the page fault, wherein one or more of the page fault and management of the page fault is to be hidden from a graphics application.

20. A method comprising:
providing via a three-dimensional (3D) graphics pipeline texture sample location data corresponding to a texture, wherein sampling of the texture is executed external to the 3D graphics pipeline;
waiting the 3D graphics pipeline until a compute pipeline fixes a page fault to composite a frame, wherein the waiting synchronizes the 3D graphics pipeline with a compute pipeline without an explicit finish;
executing via the compute pipeline sampling utilizing the texture sample location data;
providing via the compute pipeline texture sample result data corresponding to the texture, wherein the 3D graphics pipeline is to composite a frame utilizing the texture sample result data; and
managing via the compute pipeline the page fault, wherein one or more of the page fault and management of the page fault is to be hidden from a graphics application.

21. At least one non-transitory computer readable storage medium comprising one or more instructions that when executed on a computing device cause the computing device to:
provide via a three-dimensional (3D) graphics pipeline texture sample location data corresponding to a texture, wherein sampling of the texture is to be executed external to the 3D graphics pipeline;
wait the 3D graphics pipeline until a compute pipeline is to fix a page fault to composite a frame, wherein the wait is to synchronize the 3D graphics pipeline with a compute pipeline without an explicit finish;
execute via the compute pipeline sampling utilizing the texture sample location data;
provide via the compute pipeline texture sample result data corresponding to the texture, wherein the 3D graphics pipeline is to composite a frame utilizing the texture sample result data; and
manage via the compute pipeline the page fault, wherein one or more of the page fault and management of the page fault is to be hidden from a graphics application.

22. An apparatus comprising:
one or more processors including one or more pipelines, the one or more pipelines including:
a three-dimensional (3D) graphics pipeline including a texture sample location module to provide texture sample location data corresponding to a texture, wherein sampling of the texture is to be executed external to the 3D graphics pipeline; and
a compute pipeline including a texture sample result module to execute sampling of the texture utilizing the texture sample location data and to provide texture sample result data corresponding to the texture, wherein the compute pipeline is to implement one or more of a level of detail (LOD) bias and a thread subset dispatch to allow the compute pipeline to catch up with the 3D graphics pipeline, and wherein a render module of the 3D graphics pipeline is to composite a frame utilizing the texture sample result data.

23. A method comprising:

providing via a three-dimensional (3D) graphics pipeline texture sample location data corresponding to a texture, wherein sampling of the texture is executed external to the 3D graphics pipeline;

executing via a compute pipeline sampling utilizing the texture sample location data; and providing via the compute pipeline texture sample result data corresponding to the texture, wherein the compute pipeline implements one or more of a level of detail (LOD) bias and a thread subset dispatch to allow the compute pipeline to catch up with the 3D graphics pipeline, and wherein the 3D graphics pipeline is to composite a frame utilizing the texture sample result data.

24. At least one non-transitory computer readable storage medium comprising one or more instructions that when executed on a computing device cause the computing device to:

provide via a three-dimensional (3D) graphics pipeline texture sample location data corresponding to a texture, wherein sampling of the texture is to be executed external to the 3D graphics pipeline;

execute via a compute pipeline sampling utilizing the texture sample location data; and provide via the compute pipeline the texture sample result data corresponding to the texture, wherein the compute pipeline is to implement one or more of a level of detail (LOD) bias and a thread subset dispatch to allow the compute pipeline to catch up with the 3D graphics pipeline, and wherein the 3D graphics pipeline is to composite a frame utilizing the texture sample result data.

* * * * *